United States Patent
Awada et al.

(10) Patent No.: US 12,289,791 B2
(45) Date of Patent: Apr. 29, 2025

(54) NETWORK-ASSISTED FALLBACK TO CONTENTION-BASED RANDOM ACCESS

(71) Applicant: Nokia Technologies Oy, Espoo (FI)

(72) Inventors: Ahmad Awada, Munich (DE);
Muhammad Naseer-Ul-Islam, Munich (DE); Andreas Lobinger, Grafing (DE)

(73) Assignee: Nokia Technologies Oy, Espoo (FI)

( * ) Notice: Subject to any disclaimer, the term of this patent is extended or adjusted under 35 U.S.C. 154(b) by 473 days.

(21) Appl. No.: 17/632,515

(22) PCT Filed: Aug. 14, 2019

(86) PCT No.: PCT/EP2019/071860
§ 371 (c)(1),
(2) Date: Feb. 3, 2022

(87) PCT Pub. No.: WO2021/028047
PCT Pub. Date: Feb. 18, 2021

(65) Prior Publication Data
US 2022/0279408 A1 Sep. 1, 2022

(51) Int. Cl.
*H04W 76/30* (2018.01)
*H04W 36/00* (2009.01)
(Continued)

(52) U.S. Cl.
CPC ....... *H04W 76/30* (2018.02); *H04W 36/0072* (2013.01); *H04W 36/13* (2023.05);
(Continued)

(58) Field of Classification Search
CPC combination set(s) only.
See application file for complete search history.

(56) References Cited

U.S. PATENT DOCUMENTS

| 2019/0182737 A1* | 6/2019 | Futaki | H04W 36/0033 |
| 2019/0246323 A1 | 8/2019 | Kim et al. | |

(Continued)

FOREIGN PATENT DOCUMENTS

WO 2019/032853 A1 2/2019

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.

(Continued)

*Primary Examiner* — Ricky Q Ngo
*Assistant Examiner* — David M Kayal
(74) *Attorney, Agent, or Firm* — Barta Jones, PLLC

(57) ABSTRACT

There are provided measures for network-assisted fallback to contention-based random access. Such measures exemplarily comprise, at a target access point being a target of a handover of a terminal connected to at least one network slice from a source access point, receiving a handover request including information on said at least one network slice, selecting, from a plurality of pools of random access channel resources to be used for contention-based random access processing, a first pool of random access channel resources to be used by said terminal upon fallback to contention-based random access during a handover processing, wherein said selecting is based on at least one of network slice related information on terminals in radio resource control idle mode, on terminals in radio resource control inactive mode, and/or on terminals in radio resource control connected mode, and of available random access channel resources, and transmitting a handover request acknowledgement message including handover assistance
(Continued)

information indicative of said first pool of random access channel resources.

14 Claims, 16 Drawing Sheets

(51) Int. Cl.
   *H04W 72/02* (2009.01)
   *H04W 74/08* (2024.01)
   *H04W 74/0833* (2024.01)
(52) U.S. Cl.
   CPC ....... *H04W 72/02* (2013.01); *H04W 74/0841* (2013.01); *H04W 74/0866* (2013.01)

(56) References Cited

U.S. PATENT DOCUMENTS

| | | | | |
|---|---|---|---|---|
| 2020/0077356 | A1* | 3/2020 | Youn | H04W 68/02 |
| 2020/0137639 | A1* | 4/2020 | Yuan | H04W 36/0011 |
| 2020/0314913 | A1* | 10/2020 | Rastegardoost | H04L 5/0091 |
| 2021/0105820 | A1* | 4/2021 | Kim | H04B 7/022 |
| 2022/0086765 | A1* | 3/2022 | Zhang | H04W 52/50 |

OTHER PUBLICATIONS

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"3rd Generation Partnership Project; Technical Specification Group Services and System Aspects; System Architecture for the 5G System; Stage 2 (Release 16)", 3GPP TS 23.501 V16.0.2, Apr. 2019, pp. 1-317.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

"3rd Generation Partnership Project; Technical Specification Group Radio Access Network; Study on new radio access technology: Radio access architecture and interfaces (Release 14)", 3GPP TR 38.801, V14.0.0, Mar. 2017, pp. 1-91.

"RACH isolation for Slices", 3GPP TSG-RAN WG2 NR Adhoc, R2-1700121, Agenda: 3.5, Nokia, Jan. 17-19, 2017, 3 pages.

International Search Report and Written Opinion received for corresponding Patent Cooperation Treaty Application No. PCT/EP2019/071860, dated Apr. 15, 2020, 16 pages.

"Procedures and mgsB content [105bis#30][NR/2-step RACH]", 3GPP TSG-WG2 Meeting #106, R2-1906308, Agenda: 11.13.x, ZTE, May 13-17, 2019, 91 pages.

"RACH optimization in NR", 3GPP TSG RAN WG2 #106, R2-1906865, Agenda: 11.12.5, Ericsson, May 13-17, 2019, pp. 1-7.

Office action received for corresponding European Patent Application No. 19755876.0, dated Novemeber 22, 2024, 4 pages.

* cited by examiner

NETWORK-ASSISTED FALLBACK TO CONTENTION-BASED RANDOM ACCESS

RELATED APPLICATION

This application claims priority to PCT Application No. PCT/EP2019/071860, filed on Aug. 14, 2019, each of which is incorporated herein by reference in its entirety.

FIELD

The present invention relates to network-assisted fallback to contention-based random access. More specifically, the present invention exemplarily relates to measures (including methods, apparatuses and computer program products) for realizing network-assisted fallback to contention-based random access.

BACKGROUND

The present specification generally relates to the Random-Access Channel (RACH) procedure in 3rd Generation Partnership Project (3GPP) 5G New Radio (NR).

The random-access procedure is triggered by a number of events.

Namely, the random-access procedure is triggered upon an initial access from an radio resource control (RRC) Idle mode, upon an RRC connection re-establishment procedure, upon a handover, upon downlink (DL) or uplink (UL) data arrival during RRC Connected when the UL synchronization status is non-synchronized, upon UL data arriving during RRC Connected where there are no Physical Uplink Control Channel (PUCCH) resources for Scheduling Request (SR), upon an SR failure, upon a request by RRC upon synchronous reconfiguration, upon a transition from RRC Inactive, upon a request for other System Information (SI), upon a beam failure recovery, and to establish time alignment of Secondary Cell (SCell) addition in dual connectivity.

Moreover, the random-access procedure takes two distinct forms, namely the Contention-Based Random Access (CBRA) and the Contention-Free Random Access (CFRA).

FIG. 8 shows a schematic diagram of an exemplary system environment with signaling variants of a random-access procedure.

In particular, FIG. 8 shows signaling according to contention-based random access.

In a first step in FIG. 8 ("1"), a user equipment (UE) selects one RACH preamble out of a configured set and transmits the preamble in one of the pre-determined RACH occasions.

In a second step in FIG. 8 ("2"), a gNB sends a Random-Access Response (RAR) generated by a Medium Access Control (MAC) layer. The RAR provides timing advance, initial UL grant to send Msg3 (Message 3) and assignment of temporary Cell-Radio Network Temporary Identifier (C-RNTI).

In a third step in FIG. 8 ("3"), using the UL grant provided in RAR, the UE sends Msg3 to the gNB. The content for Msg3 depends on whether the UE performs initial access (Msg3 would be RRCSetupRequest), RRC re-establishment (Msg3 would be RRCReestablishment), or handover (Msg3 would be RRCReconfigurationComplete) or beam failure recovery (Msg3 would consist of C-RNTI MAC CE).

In a fourth step in FIG. 8 ("4"), contention resolution is performed in Msg4 (Message 4). UEs that experienced contention during random access, i.e., due to possible collision in preamble transmission, have to repeat the RACH procedure.

FIG. 9 shows a schematic diagram of an exemplary system environment with signaling variants of a random-access procedure.

In particular, FIG. 9 shows signaling according to contention-free random access.

In a first step in FIG. 9 ("0"), the network configures the UE with dedicated RACH preamble(s). This is done e.g. with a Handover (HO) Command.

In a second step in FIG. 9 ("1"), when performing the RACH access, the UE transmits the dedicated RACH preamble in one of the pre-configured RACH occasions.

In a third step in FIG. 9 ("2"), the RACH access procedure is completed when UE successfully receives the RAR.

During the handover from source to target cell, the UE is typically configured to perform CFRA toward the target cell. For this, the target cell indicates to the UE—in the handover command—dedicated RACH preambles to be used for accessing the target cell.

The dedicated RACH preambles can be associated either with synchronization signal blocks (SSB) or channel state information reference signals (CSI-RS).

FIG. 10 shows a schematic diagram of an exemplary system environment with signaling variants of a conditional handover procedure.

Conditional handover (CHO) is being discussed for NR Rel. 16.

The CHO is very similar to the legacy handover.

The first steps of the CHO procedure ("Phase 1: CHO preparation") are identical to the legacy handover. A configured event triggers the UE to send a measurement report. Based on this report, the source typically prepares the target for the handover (Handover Request+Handover Request Acknowledgement) and then sends a handover command to the UE.

For the legacy HO, the UE will immediately access the target cell to complete the handover.

However, as is derivable from FIG. 10 ("Phase 2: CHO execution"), for CHO, the UE will only access the target once an additional CHO execution condition expires (i.e. the HO preparation and execution phases are decoupled). The condition is typically configured, e.g. by the source when sending HO Command.

The advantage of the CHO is that the HO command can be sent very early, when the UE is still safe in the source cell, without risking the access in the target cell and the stability of its radio link. That is, conditional handover provides mobility robustness.

Network slicing is a key 5G feature to support different services using the same underlying mobile network infrastructure. Network slices can differ either in their service requirements like Ultra-Reliable Low Latency Communication (URLLC) and enhanced Mobile Broadband (eMBB) or the tenant that provides those services.

From network management perspective, different network slices can also have different key performance indicator targets/optimization goals. For example, for URLLC service, any kind of HO failures, outages, and service interruption would be critical and should be avoided as much as possible. However, for eMBB service, HO failures and service interruption would be relatively less critical than in URLLC, i.e., has more relaxed requirements.

A network slice is identified via an S-NSSAI (Single-Network Slice Selection Assistance Information).

FIG. 11 is a schematic diagram illustrating a structure of an identification information element. In particular, FIG. 11 illustrates a format of the s-NSSAI.

Currently, a UE is allowed to be simultaneously connected and served by at most eight S-NSSAIs. However, there is no limit on the number of network slices that each cell may support. In particular, the cell may support tens or even hundreds of S-NSSAIs.

The S-NSSAI may include both a Slice Service Type (SST) field and a Slice Differentiator (SD) field with a total length of 32 bits, or may include only the SST field part in which case the length of S-NSSAI is only 8 bits.

The SST field may have standardized and non-standardized values. Values 0 to 127 may belong to the standardized SST range. The values 0 to 127 may correspond to those defined in "3GPP Technical Specification (TS) 23.501, System Architecture for the 5G system (Release 15)". For instance, an SST value of 1 may indicate that the slice is suitable for handling of 5G eMBB, and an SST value of 2 may indicate that the slice is suitable for handling of URLLC. The SD field may be operator-defined only.

FIG. 12 is a schematic diagram of a random-access procedure implementing contention-free random access and contention-based random access.

In particular, FIG. 12 summarizes the selection of a RACH preamble.

As can be seen n FIG. 12, if the UE has been explicitly configured by the network (e.g. in handover command) with CFRA resources that are associated with SSBs/CSI-RSs and at least one of these SSBs/CSI-RSs has L1-Reference Signal Received Strength (RSRP) above a certain threshold denoted herein by e.g. Qin_LR, then the UE selects an SSB/CSI-RS among the associated SSBs/CSI-RSs having L1-RSRP above threshold Qin_LR (Link Recovery) and uses the dedicated CFRA resources corresponding to the selected SSB/CSI-RS for performing the random access.

If none of the SSB/CSI-RS associated with CFRA has a L1-RSRP above threshold Qin_LR, the UE fallbacks to perform CBRA.

Herein, the UE checks first if at least one of the SSBs with a L1-RSRP above another threshold rsrp-ThresholdSSB is available.

If such SSB(s) with a L1-RSRP above another threshold rsrp-ThresholdSSB is/are available, the UE selects an SSB with L1-RSRP above the threshold rsrp-ThresholdSSB, otherwise the UE selects any SSB. In both cases, the UE performs CBRA on the selected SSB.

It has been discussed that RACH resources (preamble, time/frequency resources) could be split among different groups of UEs pertaining to e.g., different network slices resulting in so-called pools of RACH resources.

A UE may be connected to eight different network slices. During the handover preparation, the target cell is aware of the UE PDU sessions pertaining to different network slices and as such it can decide from which pool of RACH resources to select the CFRA resources.

However, such approach is not applicable for the decision which pool of RACH resources to select in case the UE with multiple PDU sessions pertaining to different network slices fallbacks to CBRA during the handover.

Hence, the problem arises of how a UE that is served by multiple network slices shall select properly the right pool of RACH resources when falling back to CBRA such that the collision probability is reduced and in turn the success rate of the handover is increased. This would especially be relevant in CHO, as radio conditions for the UE might change in between HO preparation and HO execution, where CFRA resources may not be valid at the time of HO execution and UE has to fallback to CBRA resources.

Hence, there is a need to provide for network-assisted fallback to contention-based random access.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of a target access point being a target of a handover of a terminal connected to at least one network slice from a source access point, the method comprising receiving a handover request including information on said at least one network slice, selecting, from a plurality of pools of random access channel resources to be used for contention-based random access processing, a first pool of random access channel resources to be used by said terminal upon fallback to contention-based random access during a handover processing, wherein said selecting is based on at least one of network slice related information on terminals in radio resource control idle mode, on terminals in radio resource control inactive mode, and/or on terminals in radio resource control connected mode, and of available random access channel resources, and transmitting a handover request acknowledgement message including handover assistance information indicative of said first pool of random access channel resources.

According to an exemplary aspect of the present invention, there is provided a method of a source access point being a source of a handover of a terminal connected to at least one network slice from said source access point to a target access point, the method comprising transmitting a handover request including information on said at least one network slice, receiving a handover request acknowledgement message including handover assistance information indicative of a first pool of random access channel resources of a plurality of pools of random access channel resources to be used for contention-based random access processing, said first pool of random access channel resources being to be used by said terminal upon fallback to contention-based random access during a handover processing, and transmitting a handover command message including a specification of random access channel resources to be used by said terminal for contention-free random access during a handover processing and said handover assistance information indicative of said first pool of random access channel resources.

According to an exemplary aspect of the present invention, there is provided a method of a terminal connected to at least one network slice and being subject to a handover from a source access point to a target access point, the method comprising receiving a handover command message including a specification of random access channel resources to be used by said terminal for contention-free random access during a handover processing and handover assistance information indicative of a first pool of random access channel resources of a plurality of pools of random access channel resources to be used for contention-based random access processing, said first pool of random access channel resources being to be used by said terminal upon fallback to contention-based random access during said handover processing, and utilizing said first pool of random access channel resources upon fallback to contention-based random access during said handover processing.

According to an exemplary aspect of the present invention, there is provided an apparatus of a target access point being a target of a handover of a terminal connected to at least one network slice from a source access point, the apparatus comprising receiving circuitry configured to receive a handover request including information on said at least one network slice, selecting circuitry configured to select, from a plurality of pools of random access channel resources to be used for contention-based random access processing, a first pool of random access channel resources to be used by said terminal upon fallback to contention-based random access during a handover processing, wherein said selecting is based on at least one of network slice related information on terminals in radio resource control idle mode, on terminals in radio resource control inactive mode, and/or on terminals in radio resource control connected mode, and of available random access channel resources, and transmitting circuitry configured to transmit a handover request acknowledgement message including handover assistance information indicative of said first pool of random access channel resources.

According to an exemplary aspect of the present invention, there is provided an apparatus of a source access point being a source of a handover of a terminal connected to at least one network slice from said source access point to a target access point, the apparatus comprising transmitting circuitry configured to transmit a handover request including information on said at least one network slice, receiving circuitry configured to receive a handover request acknowledgement message including handover assistance information indicative of a first pool of random access channel resources of a plurality of pools of random access channel resources to be used for contention-based random access processing, said first pool of random access channel resources being to be used by said terminal upon fallback to contention-based random access during a handover processing, and transmitting circuitry configured to transmit a handover command message including a specification of random access channel resources to be used by said terminal for contention-free random access during a handover processing and said handover assistance information indicative of said first pool of random access channel resources.

According to an exemplary aspect of the present invention, there is provided an apparatus of a terminal connected to at least one network slice and being subject to a handover from a source access point to a target access point, the apparatus comprising receiving circuitry configured to receive a handover command message including a specification of random access channel resources to be used by said terminal for contention-free random access during a handover processing and handover assistance information indicative of a first pool of random access channel resources of a plurality of pools of random access channel resources to be used for contention-based random access processing, said first pool of random access channel resources being to be used by said terminal upon fallback to contention-based random access during said handover processing, and utilizing circuitry configured to utilize said first pool of random access channel resources upon fallback to contention-based random access during said handover processing.

According to an exemplary aspect of the present invention, there is provided an apparatus of a target access point being a target of a handover of a terminal connected to at least one network slice from a source access point, the apparatus comprising at least one processor, at least one memory including computer program code, and at least one interface configured for communication with at least another apparatus, the at least one processor, with the at least one memory and the computer program code, being configured to cause the apparatus to perform receiving a handover request including information on said at least one network slice, selecting, from a plurality of pools of random access channel resources to be used for contention-based random access processing, a first pool of random access channel resources to be used by said terminal upon fallback to contention-based random access during a handover processing, wherein said selecting is based on at least one of network slice related information on terminals in radio resource control idle mode, on terminals in radio resource control inactive mode, and/or on terminals in radio resource control connected mode, and of available random access channel resources, and transmitting a handover request acknowledgement message including handover assistance information indicative of said first pool of random access channel resources.

According to an exemplary aspect of the present invention, there is provided an apparatus of a source access point being a source of a handover of a terminal connected to at least one network slice from said source access point to a target access point, the apparatus comprising at least one processor, at least one memory including computer program code, and at least one interface configured for communication with at least another apparatus, the at least one processor, with the at least one memory and the computer program code, being configured to cause the apparatus to perform transmitting a handover request including information on said at least one network slice, receiving a handover request acknowledgement message including handover assistance information indicative of a first pool of random access channel resources of a plurality of pools of random access channel resources to be used for contention-based random access processing, said first pool of random access channel resources being to be used by said terminal upon fallback to contention-based random access during a handover processing, and transmitting a handover command message including a specification of random access channel resources to be used by said terminal for contention-free random access during a handover processing and said handover assistance information indicative of said first pool of random access channel resources.

According to an exemplary aspect of the present invention, there is provided an apparatus of a terminal connected to at least one network slice and being subject to a handover from a source access point to a target access point, the apparatus comprising at least one processor, at least one memory including computer program code, and at least one interface configured for communication with at least another apparatus, the at least one processor, with the at least one memory and the computer program code, being configured to cause the apparatus to perform receiving a handover command message including a specification of random access channel resources to be used by said terminal for contention-free random access during a handover processing and handover assistance information indicative of a first pool of random access channel resources of a plurality of pools of random access channel resources to be used for contention-based random access processing, said first pool of random access channel resources being to be used by said terminal upon fallback to contention-based random access during said handover processing, and utilizing said first pool of random access channel resources upon fallback to contention-based random access during said handover processing.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient assistance in selection of a pool of RACH resources when the UE falls back to CBRA and an efficient selection of the pool of RACH resources when the UE falls back to CBRA to thereby solve at least part of the problems and drawbacks identified in relation to the prior art.

By way of exemplary embodiments of the present invention, there is provided network-assisted fallback to contention-based random access. More specifically, by way of exemplary embodiments of the present invention, there are provided measures and mechanisms for realizing network-assisted fallback to contention-based random access.

Thus, improvement is achieved by methods, apparatuses and computer program products enabling/realizing network-assisted fallback to contention-based random access.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
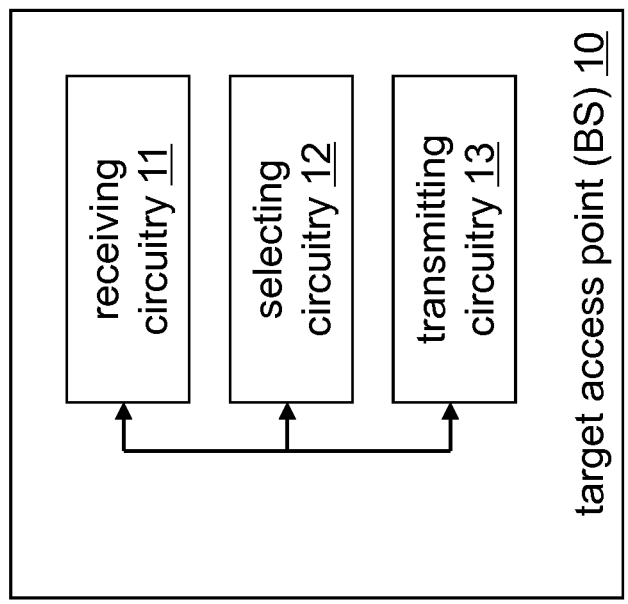
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) network-assisted fallback to contention-based random access.

One approach to address the problems underlying the present invention would be that the UE selects randomly one pool of RACH resources out of those that are associated with networks slices that it is connecting to.

For instance, it is assumed that the UE has two protocol data unit (PDU) sessions 1 and 2 that are corresponding to network slices A and B, respectively. Moreover, it is considered that at the time of handover/CHO execution, much more UEs are camping (RRC Idle/Inactive mode UEs) or connected (RRC Connected mode UEs) to slice A rather than slice B. That is, the collision probability of slice A is much higher than that of slice B. If the UE has selected randomly the pool of RACH resources of A according to the above-mentioned approach, then the random access performed by the UE would be more susceptible to collision compared to that performed using the pool of RACH resources of B.

Here, it is noted that planning the RACH resources is easier in case of CFRA, since the network is aware of the PDU sessions of the UEs and their corresponding network slices and the number of UEs camping/connected to each network slice. That is, the target cell is able to configure the right RACH configuration for CFRA in light of the information it has.

In general terms, according to exemplary embodiments of the present invention, the target cell (via the source cell) provides the UE in the handover command with some assistance information about which pool of RACH resource(s) to use when falling back to CBRA from CFRA during the handover.

The network may indicate in the handover command which pool of RACH resource(s) to use when falling back to CBRA.

In case the UE performing CHO is re-configured by the target cell between the handover preparation and execution phase, the target cell may provide the UE with an updated assistance information in RRC re-configuration (handover command).

As the UE performing CHO keeps the communication with the source cell after receiving the HO command, according to further exemplary embodiments of the present invention, the target cell may provide proactively different assistance information to be applied in case the UE establishes new PDU sessions to new network slices or removes some of the existing PDU sessions. This is especially relevant in case the RRC re-configuration (leading to releasing or adding new PDU sessions) is performed by the source cell and the UE synchronizes its RRC configuration with the target cell during (or right after) the RACH procedure.

Exemplary embodiments of the present invention are explained in more specific terms referring to FIGS. 1 to 7.

Figure 5:
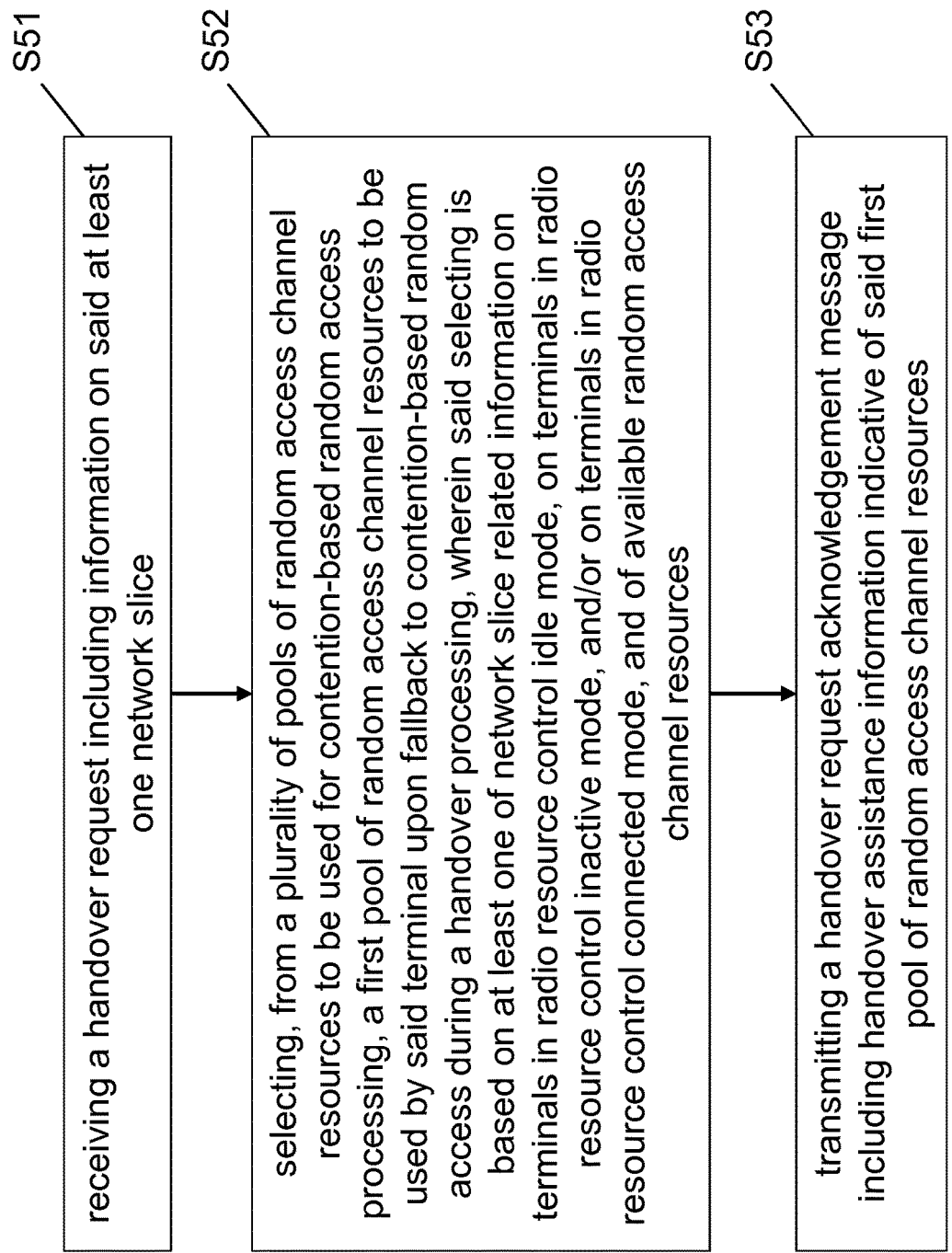
FIG. 5 is a schematic diagram of a procedure according to exemplary embodiments of the present invention.

FIG. 1 is a block diagram illustrating an apparatus according to exemplary embodiments of the present invention. The apparatus may be an access node 10 (target access point) such as a base station comprising receiving circuitry 11, selecting circuitry 12, and transmitting circuitry 13. The target access point being a target of a handover of a terminal connected to at least one network slice from a source access point. The receiving circuitry 11 receives a handover request including information on said at least one network slice. The selecting circuitry 12 selects, from a plurality of pools of random access channel resources to be used for contention-based random access processing, a first pool of random access channel resources to be used by said terminal upon fallback to contention-based random access during a handover processing, wherein said selecting is based on at least one of network slice related information on terminals in radio resource control idle mode, on terminals in radio resource control inactive mode, and/or on terminals in radio resource control connected mode, and of available random access channel resources. The transmitting circuitry 13 transmits a handover request acknowledgement message including handover assistance information indicative of said first pool of random access channel resources. FIG. 5 is a schematic diagram of a procedure according to exemplary embodiments of the present invention. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to exemplary embodiments of the present invention comprises an operation of receiving (S51) a handover request including information on said at least one network slice, an operation of selecting (S52), from a plurality of pools of random access channel resources to be used for contention-based random access processing, a first pool of random access channel resources to be used by said terminal upon fallback to contention-based random access during a handover processing, wherein said selecting is based on at least one of network slice related information on terminals in RRC idle mode, on terminals in RRC inactive mode, and/or on terminals in RRC connected mode, and of available random access channel resources, and an operation of transmitting (S53) a handover request acknowledgement message including handover assistance information indicative of said first pool of random access channel resources.

In an embodiment at least some of the functionalities of the apparatus shown in FIG. 1 may be shared between two physically separate devices forming one operational entity. Therefore, the apparatus may be seen to depict the operational entity comprising one or more physically separate devices for executing at least some of the described processes.

According to further exemplary embodiments of the present invention, each of said plurality of pools of random access channel resources corresponds to a respective of a plurality of network slices, and said handover assistance information comprises a specification of a first network slice of said at least one network slice, wherein said first network slice is associated with said first pool of random access channel resources.

According to further exemplary embodiments of the present invention, each of said plurality of pools of random access channel resources has a respective index, and said handover assistance information comprises a specification of an index of said first pool of random access channel resources.

According to further exemplary embodiments of the present invention, each of said plurality of pools of random access channel resources is associated with a respective set of random access channel preambles.

According to further exemplary embodiments of the present invention, said handover assistance information comprises a specification of a transmit power to be used by said terminal upon fallback to contention-based random access during said handover processing when using said first pool of random access channel resources.

According to further exemplary embodiments of the present invention, said handover assistance information is further indicative of a second pool of random access channel resources to be used by said terminal upon fallback to contention-based random access during said handover processing when a new protocol data unit session corresponding to a new network slice different from said at least one network slice is established.

According to further exemplary embodiments of the present invention, said handover assistance information is further indicative of a third pool of random access channel resources to be used by said terminal upon fallback to contention-based random access during said handover processing when a protocol data unit session corresponding to a network slice of said at least one network slice is released.

According to further exemplary embodiments of the present invention, said handover assistance information is further indicative of a fourth pool of random access channel resources to be used by said terminal upon fallback to contention-based random access during said handover processing when a new protocol data unit session corresponding to a new network slice different from said at least one network slice is established and a protocol data unit session corresponding to a network slice of said at least one network slice is released.

According to further exemplary embodiments of the present invention, said handover request is received from said source access point, and said handover request acknowledgement message is transmitted to said source access point.

The handover processing may be a conditional handover processing.

According to further exemplary embodiments of the present invention, said first pool of random access channel resources is a pre-defined first pool of random access channel resources.

According to further exemplary embodiments of the present invention, said information indicative of said pre-defined first pool of random access channel resources are provided in system information.

Figure 2:
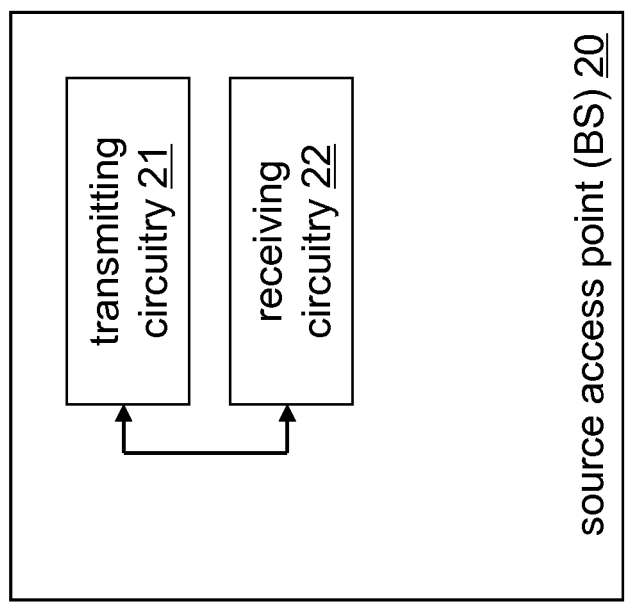
FIG. 2 is a block diagram illustrating an apparatus according to exemplary embodiments of the present invention.
Figure 6:
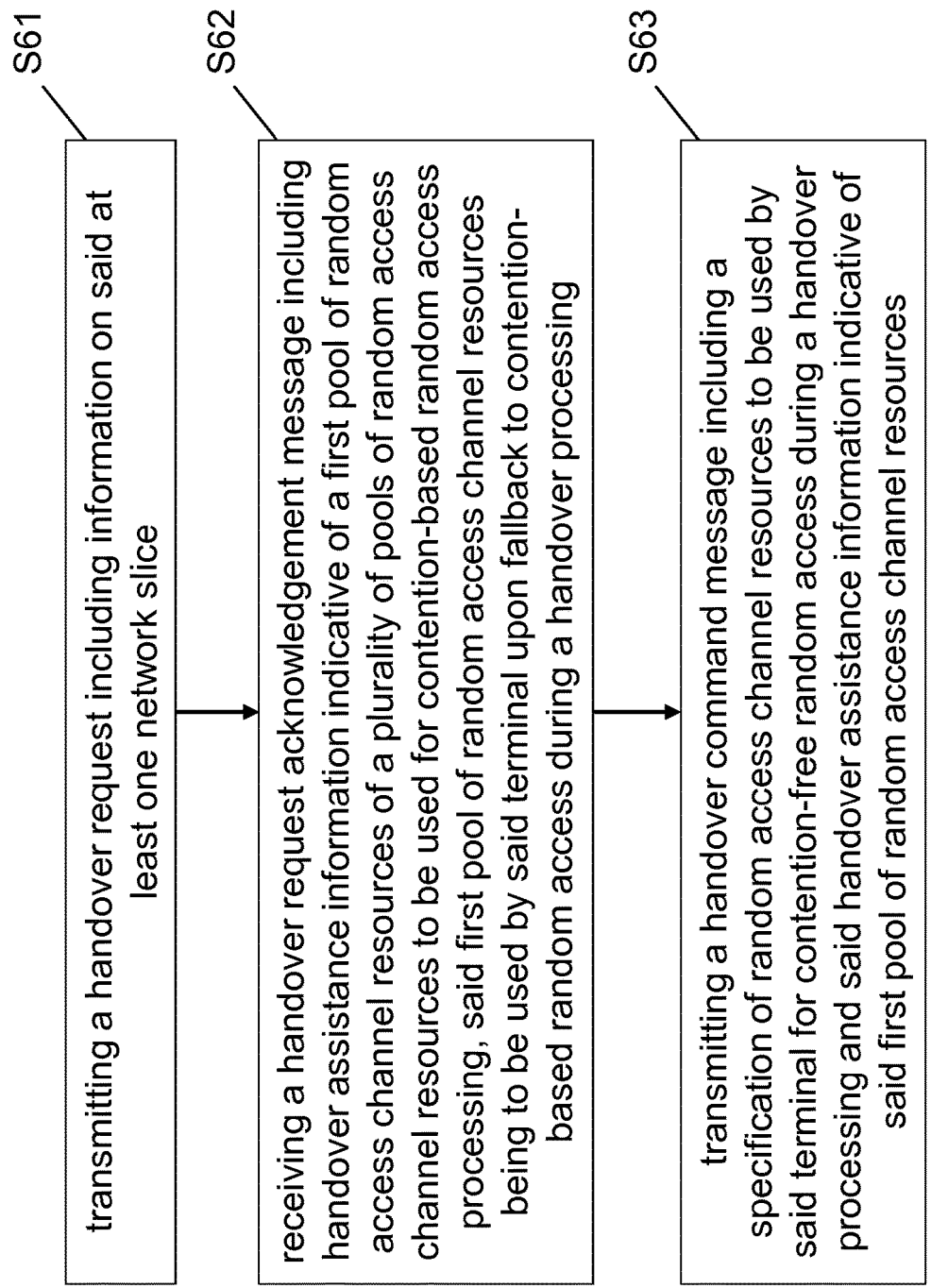
FIG. 6 is a schematic diagram of a procedure according to exemplary embodiments of the present invention.

FIG. 2 is a block diagram illustrating an apparatus according to exemplary embodiments of the present invention. The apparatus may be an access node 20 (source/serving access point) such as a base station comprising transmitting circuitry 21 and receiving circuitry 22. The source access point being a source of a handover of a terminal connected to at least one network slice from said source access point to a target access point. The transmitting circuitry 21 transmits a handover request including information on said at least one network slice. The receiving circuitry 22 receives a handover request acknowledgement message including handover assistance information indicative of a first pool of random access channel resources of a plurality of pools of random access channel resources to be used for contention-based random access processing, said first pool of random access channel resources being to be used by said terminal upon fallback to contention-based random access during a handover processing. The transmitting circuitry 21 (or a second transmitting circuitry) transmits a handover command message including a specification of random access channel resources to be used by said terminal for contention-free random access during a handover processing and said handover assistance information indicative of said first pool of random access channel resources. FIG. 6 is a schematic diagram of a procedure according to exemplary embodiments of the present invention. The apparatus according to FIG. 2 may perform the method of FIG. 6 but is not limited to this method. The method of FIG. 6 may be performed by the apparatus of FIG. 2 but is not limited to being performed by this apparatus.

As shown in FIG. 6, a procedure according to exemplary embodiments of the present invention comprises an operation of transmitting (S61) a handover request including information on said at least one network slice, an operation of receiving (S62) a handover request acknowledgement message including handover assistance information indicative of a first pool of random access channel resources of a plurality of pools of random access channel resources to be used for contention-based random access processing, said first pool of random access channel resources being to be used by said terminal upon fallback to contention-based random access during a handover processing, and an operation of transmitting (S63) a handover command message including a specification of random access channel resources to be used by said terminal for contention-free random access during a handover processing and said handover assistance information indicative of said first pool of random access channel resources.

In an embodiment at least some of the functionalities of the apparatus shown in FIG. 2 may be shared between two physically separate devices forming one operational entity. Therefore, the apparatus may be seen to depict the operational entity comprising one or more physically separate devices for executing at least some of the described processes.

According to further exemplary embodiments of the present invention, said first pool of random access channel resources is selected from said plurality of pools of random access channel resources based on at least one of network slice related information on terminals in RRC idle mode, on terminals in RRC inactive mode, and/or on terminals in RRC connected mode, and of available random access channel resources.

According to further exemplary embodiments of the present invention, each of said plurality of pools of random access channel resources corresponds to a respective of a plurality of network slices, and said handover assistance information comprises a specification of a first network slice of said at least one network slice, wherein said first network slice is associated with said first pool of random access channel resources.

According to further exemplary embodiments of the present invention, each of said plurality of pools of random access channel resources has a respective index, and said handover assistance information comprises a specification of an index of said first pool of random access channel resources.

According to further exemplary embodiments of the present invention, each of said plurality of pools of random access channel resources is associated with a respective set of random access channel preambles.

According to further exemplary embodiments of the present invention, said handover assistance information comprises a specification of a transmit power to be used by said terminal upon fallback to contention-based random access during said handover processing when using said first pool of random access channel resources.

According to further exemplary embodiments of the present invention, said handover assistance information is further indicative of a second pool of random access channel resources to be used by said terminal upon fallback to contention-based random access during said handover processing when a new protocol data unit session corresponding to a new network slice different from said at least one network slice is established.

According to further exemplary embodiments of the present invention, said handover assistance information is further indicative of a third pool of random access channel resources to be used by said terminal upon fallback to contention-based random access during said handover processing when a protocol data unit session corresponding to a network slice of said at least one network slice is released.

According to further exemplary embodiments of the present invention, said handover assistance information is further indicative of a fourth pool of random access channel resources to be used by said terminal upon fallback to contention-based random access during said handover processing when a new protocol data unit session corresponding to a new network slice different from said at least one network slice is established and a protocol data unit session corresponding to a network slice of said at least one network slice is released.

According to further exemplary embodiments of the present invention, said handover request is transmitted to said target access point, said handover request acknowledgement message is received from said target access point, and said handover command message is transmitted to said terminal.

The handover processing may be a conditional handover processing.

According to further exemplary embodiments of the present invention, said first pool of random access channel resources is a pre-defined first pool of random access channel resources.

According to further exemplary embodiments of the present invention, said information indicative of said pre-defined first pool of random access channel resources are provided in system information.

Figure 3:
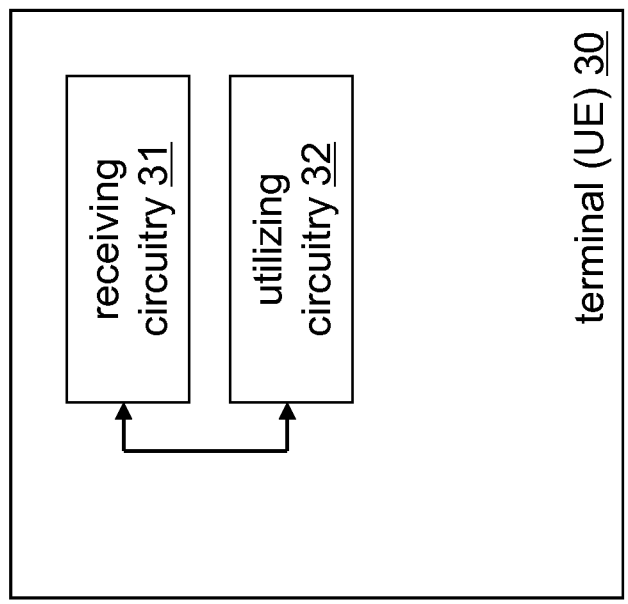
FIG. 3 is a block diagram illustrating an apparatus according to exemplary embodiments of the present invention.
Figure 7:
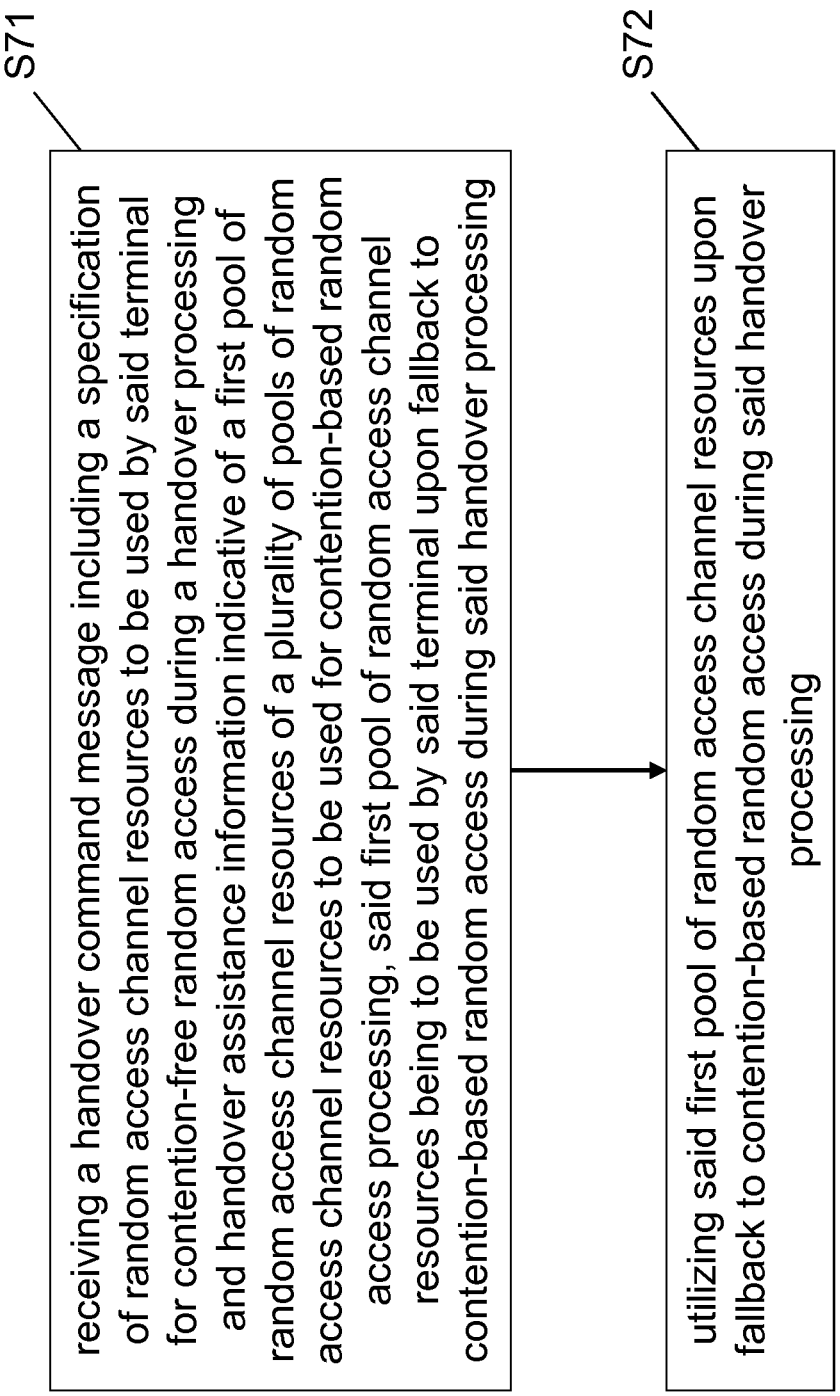
FIG. 7 is a schematic diagram of a procedure according to exemplary embodiments of the present invention.
Figure 8:
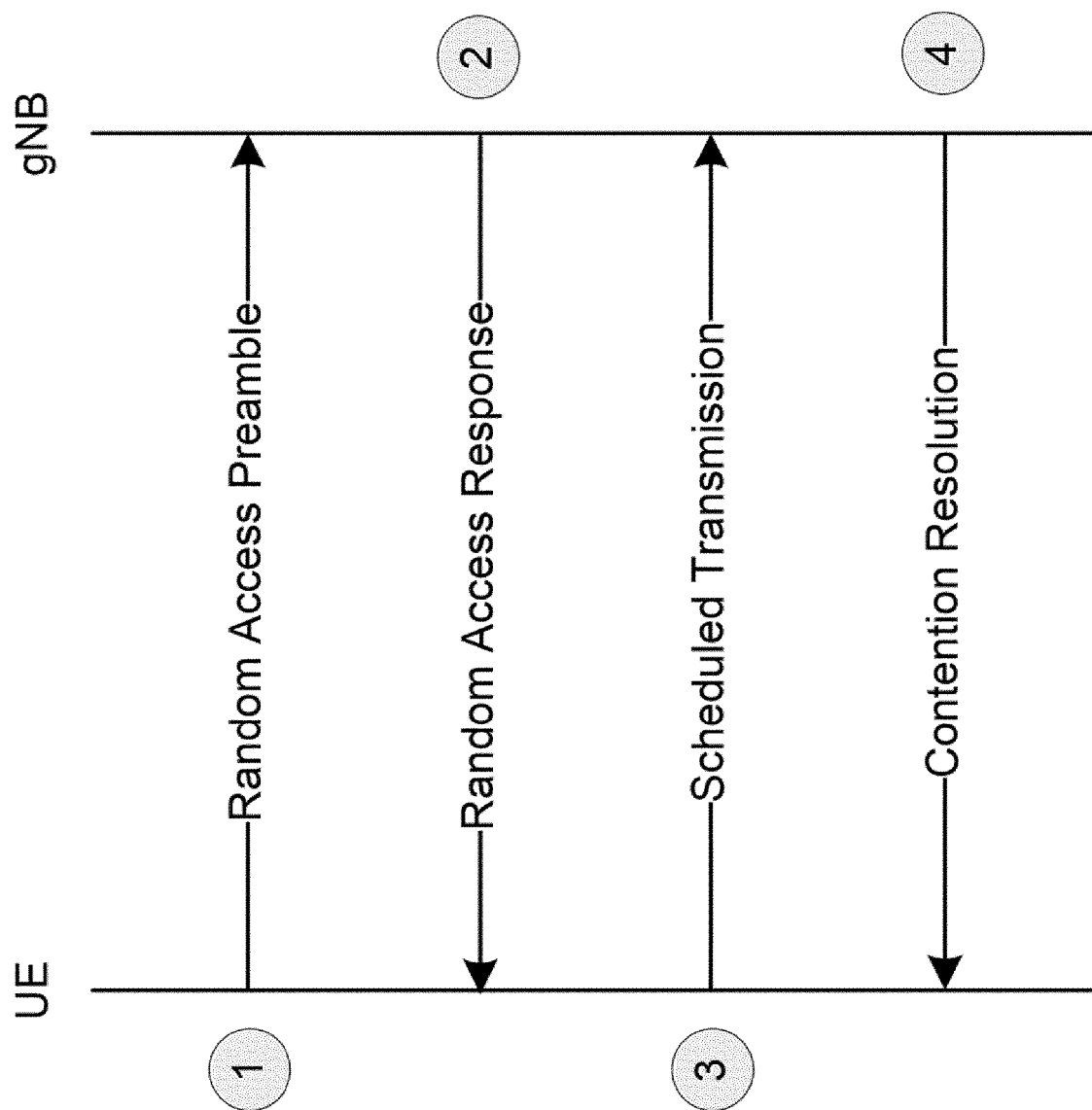
FIG. 8 shows a schematic diagram of an exemplary system environment with signaling variants of a random-access procedure.
Figure 9:
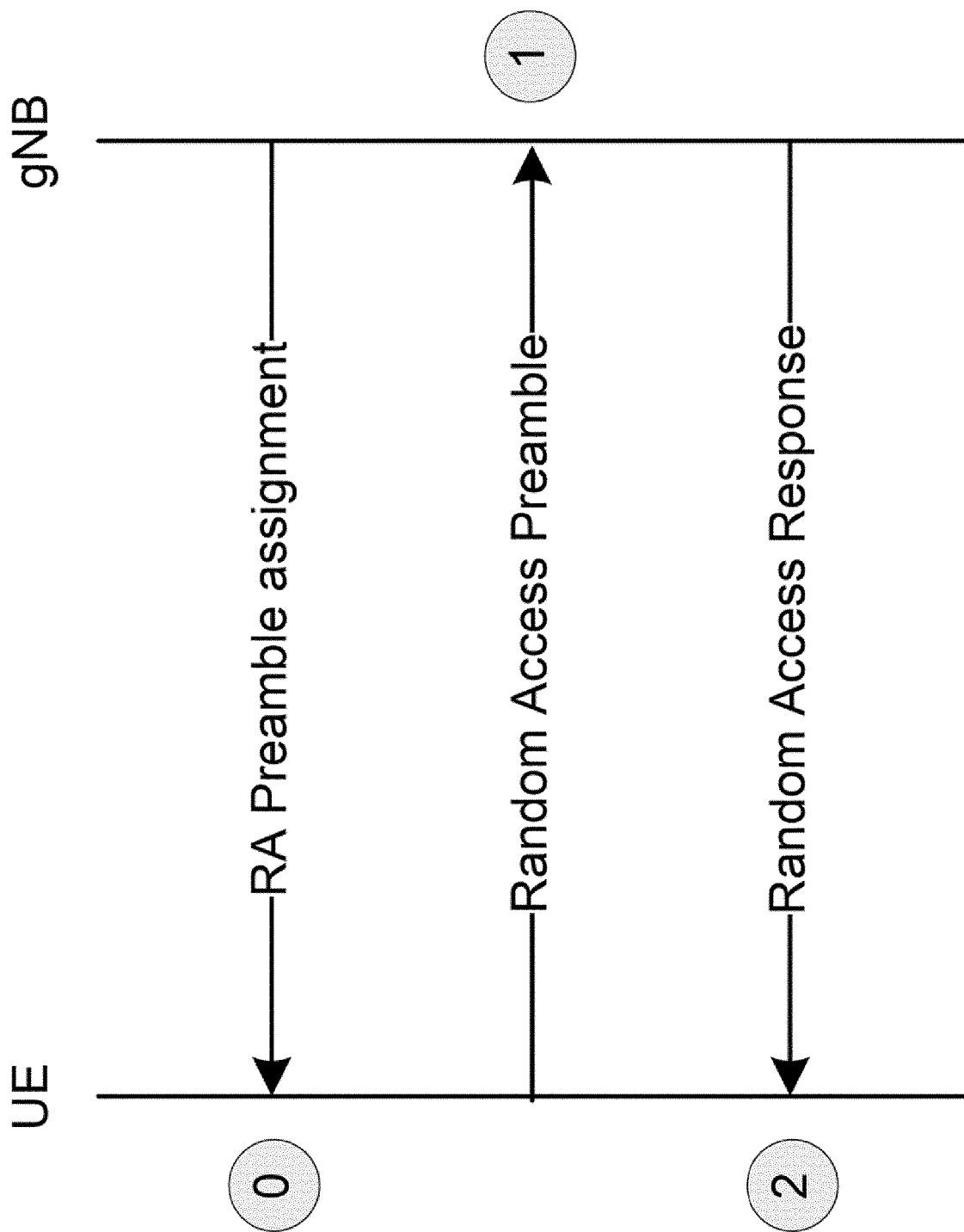
FIG. 9 shows a schematic diagram of an exemplary system environment with signaling variants of a random-access procedure.
Figure 10:
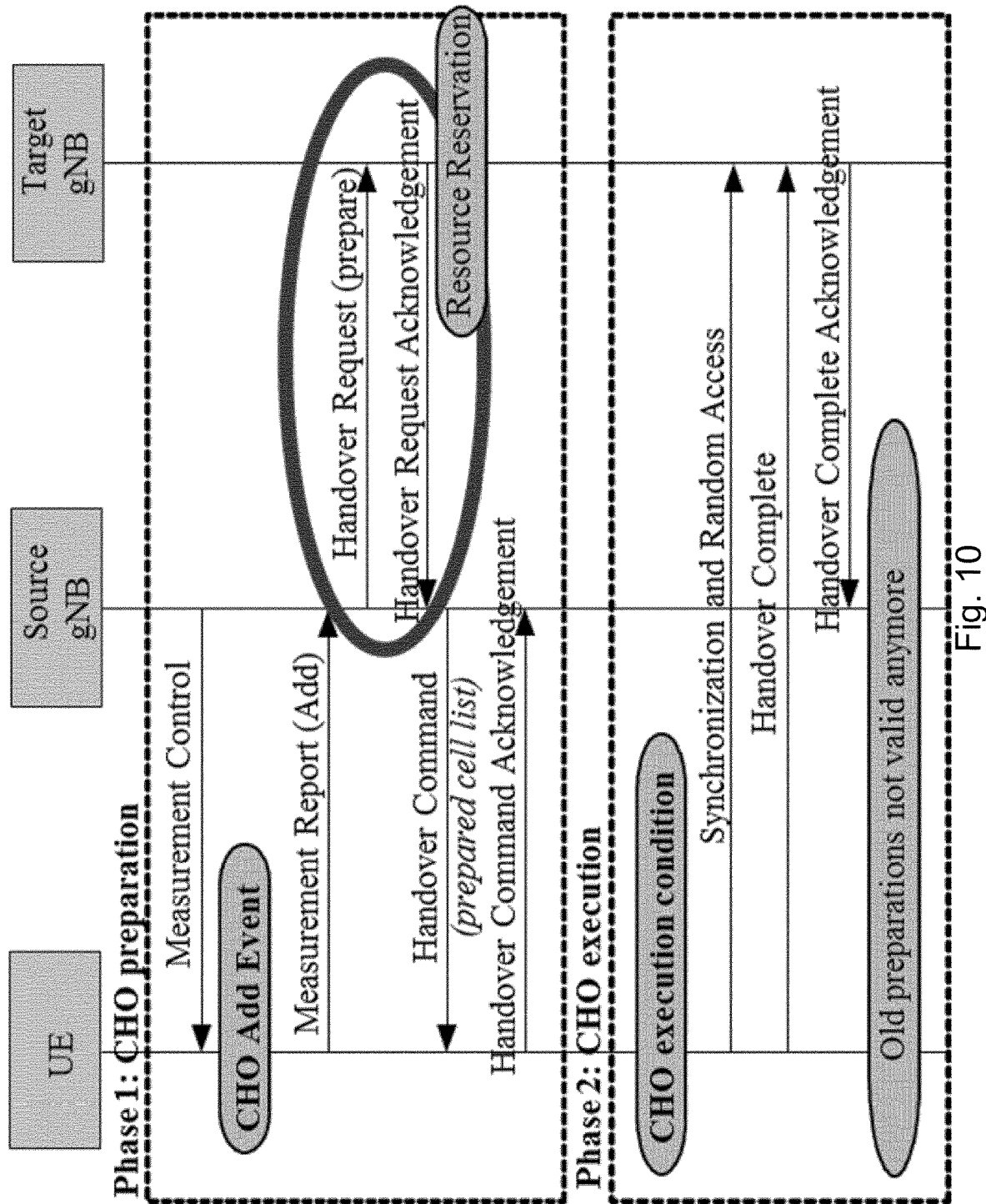
FIG. 10 shows a schematic diagram of an exemplary system environment with signaling variants of a conditional handover procedure.
Figure 11:
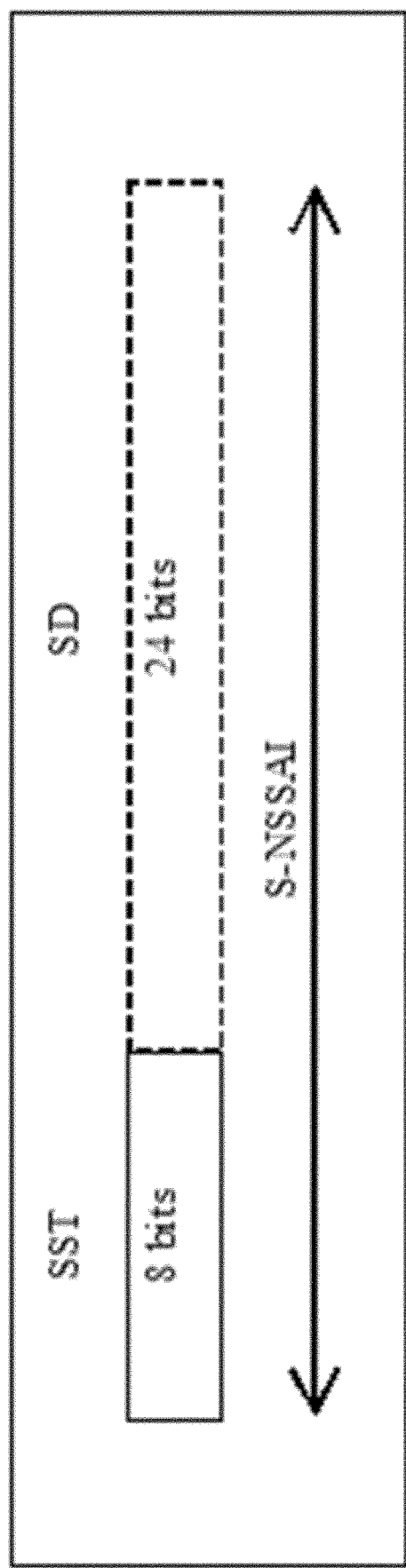
FIG. 11 is a schematic diagram illustrating a structure of an identification information element.
Figure 12:
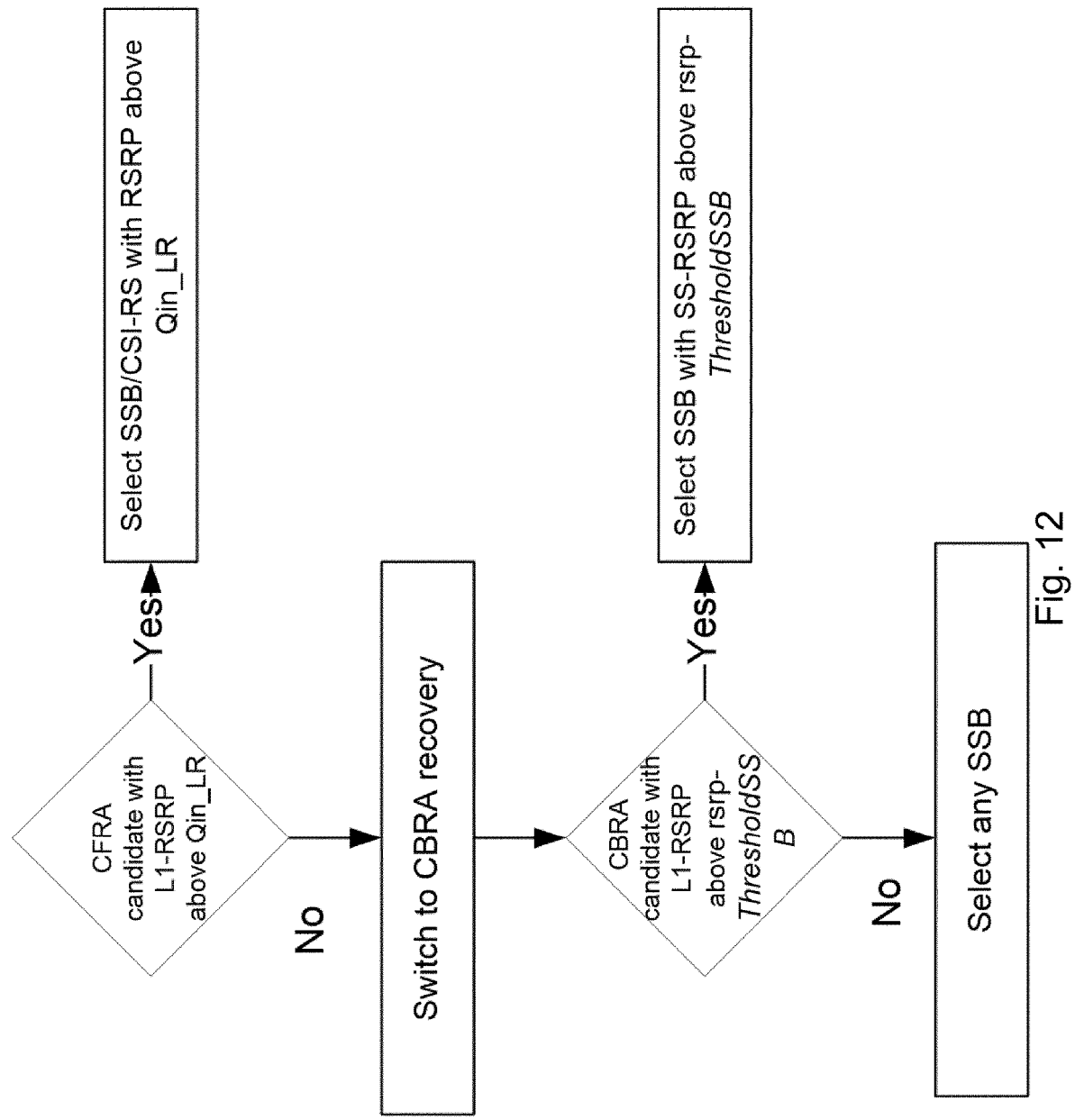
FIG. 12 is a schematic diagram of a random-access procedure implementing contention-free random access and contention-based random access.

FIG. 3 is a block diagram illustrating an apparatus according to exemplary embodiments of the present invention. The apparatus may be a terminal 30 such as a user equipment comprising receiving circuitry 31 and utilizing circuitry 32. The terminal being connected to at least one network slice and being subject to a handover from a source access point to a target access point. The receiving circuitry 31 receives a handover command message including a specification of random access channel resources to be used by said terminal for contention-free random access during a handover processing and handover assistance information indicative of a first pool of random access channel resources of a plurality of pools of random access channel resources to be used for contention-based random access processing, said first pool of random access channel resources being to be used by said terminal upon fallback to contention-based random access during said handover processing. The utilizing circuitry 32 utilizes said first pool of random access channel resources upon fallback to contention-based random access during said handover processing. FIG. 7 is a schematic diagram of a procedure according to exemplary embodiments of the present invention. The apparatus according to FIG. 3 may perform the method of FIG. 7 but is not limited to this method. The method of FIG. 7 may be performed by the apparatus of FIG. 3 but is not limited to being performed by this apparatus.

As shown in FIG. 7, a procedure according to exemplary embodiments of the present invention comprises an operation of receiving (S71) a handover command message including a specification of random access channel resources to be used by said terminal for contention-free random access during a handover processing and handover assistance information indicative of a first pool of random access channel resources of a plurality of pools of random access channel resources to be used for contention-based random access processing, said first pool of random access channel resources being to be used by said terminal upon fallback to contention-based random access during said handover processing, and an operation of utilizing (S72) said first pool of random access channel resources upon fallback to contention-based random access during said handover processing.

Figure 4:
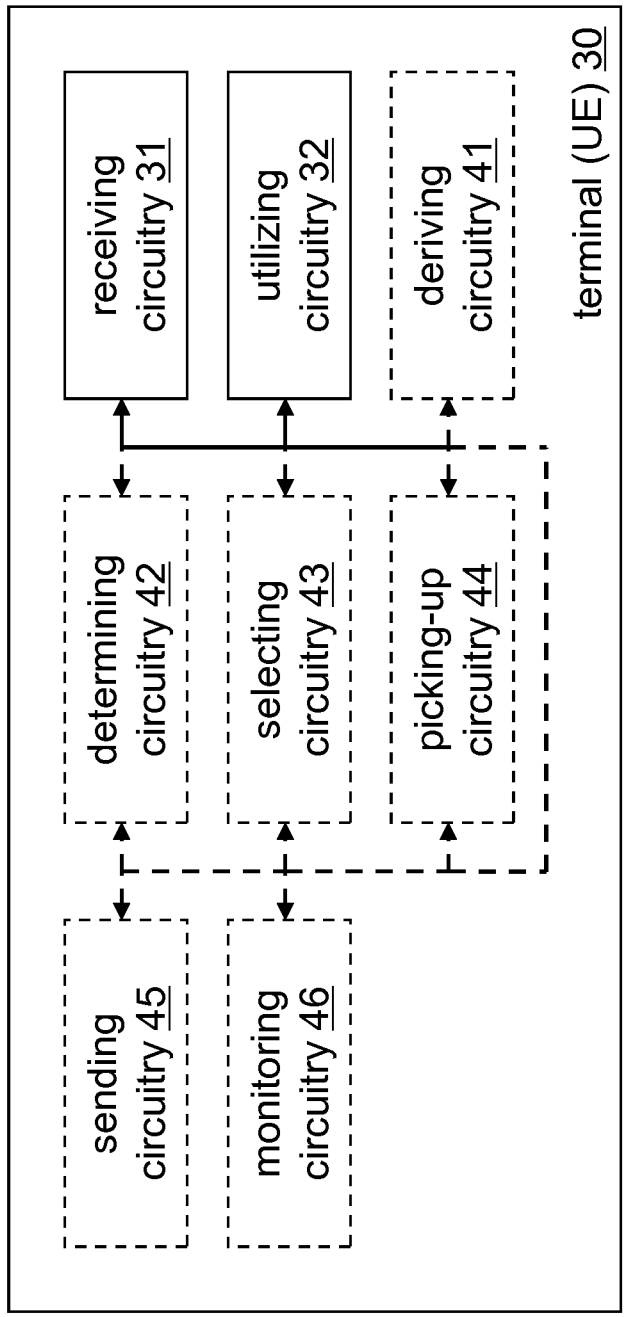
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise deriving circuitry 41, determining circuitry 42, selecting circuitry 43, picking-up circuitry 44, sending circuitry 45, and/or monitoring circuitry 46.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to further exemplary embodiments of the present invention, said first pool of random access channel resources is selected from said plurality of pools of random access channel resources based on at least one of network slice related information on terminals in RRC idle mode, on terminals in RRC inactive mode, and/or on terminals in RRC connected mode, and of available random access channel resources.

According to a variation of the procedure shown in FIG. 7, exemplary additional operations are given, which are inherently independent from each other as such. According to such variation, each of said plurality of pools of random access channel resources corresponds to a respective of a plurality of network slices, said handover assistance information comprises a specification of a first network slice of said at least one network slice, and said first network slice is associated with said first pool of random access channel resources. Further, according to such variation, an exemplary method according to exemplary embodiments of the present invention may comprise an operation of deriving said first pool of random access channel resources from said specification of said first network slice.

According to a further variation of the procedure shown in FIG. 7, exemplary additional operations are given, which are inherently independent from each other as such. According to such variation, each of said plurality of pools of random access channel resources has a respective index, and said handover assistance information comprises a specification of an index of said first pool of random access channel resources. Further, according to such variation, an exemplary method according to exemplary embodiments of the present invention may comprise an operation of deriving said first pool of random access channel resources from said specification of said index.

According to a further variation of the procedure shown in FIG. 7, exemplary additional operations are given, which are inherently independent from each other as such. According to such variation, each of said plurality of pools of random access channel resources is associated with a respective set of random access channel preambles. Further, according to such variation, an exemplary method according to exemplary embodiments of the present invention may comprise an operation of determining a first set of random access channel preambles associated with said first pool of random access channel resources, and an operation of selecting a random access channel preamble of said first set of random access channel preambles.

According to a further variation of the procedure shown in FIG. 7, exemplary details of the selecting operation are given, which are inherently independent from each other as such.

Such exemplary selecting operation according to exemplary embodiments of the present invention may comprise an operation of picking up randomly said random access channel preamble.

According to a further variation of the procedure shown in FIG. 7, exemplary additional operations are given, which are inherently independent from each other as such. According to such variation, an exemplary method according to exemplary embodiments of the present invention may comprise an operation of sending said random access channel preamble in a random access channel occasion.

According to further exemplary embodiments of the present invention, said handover assistance information comprises a specification of a transmit power to be used by said terminal upon fallback to contention-based random access during said handover processing when using said first pool of random access channel resources.

According to further exemplary embodiments of the present invention, said handover assistance information comprises a specification of a transmit power to be used by said terminal upon fallback to contention-based random access during said handover processing when using said first pool of random access channel resources, and said sending said random access channel preamble in said random access channel occasion is performed with said transmit power.

According to a further variation of the procedure shown in FIG. 7, exemplary additional operations are given, which are inherently independent from each other as such. According to such variation, said handover assistance information is further indicative of a second pool of random access channel resources to be used by said terminal upon fallback to contention-based random access during said handover processing when a new protocol data unit session corresponding to a new network slice different from said at least one network slice is established. Further, according to such variation, an exemplary method according to exemplary embodiments of the present invention may comprise an operation of monitoring for establishment of a second network slice different from said at least one network slice, and an operation of utilizing, if establishment of said second network slice is detected as a result of said monitoring, said second pool of random access channel resources upon fallback to contention-based random access during said handover processing.

According to a further variation of the procedure shown in FIG. 7, exemplary additional operations are given, which are inherently independent from each other as such. According to such variation, said handover assistance information is further indicative of a third pool of random access channel resources to be used by said terminal upon fallback to contention-based random access during said handover processing when a protocol data unit session corresponding to a network slice of said at least one network slice is released. Further, according to such variation, an exemplary method according to exemplary embodiments of the present invention may comprise an operation of monitoring for release of a third network slice of said at least one network slice, and an operation of utilizing, if release of said third network slice is detected as a result of said monitoring, said third pool of random access channel resources upon fallback to contention-based random access during said handover processing.

According to a further variation of the procedure shown in FIG. 7, exemplary additional operations are given, which are inherently independent from each other as such. According to such variation, said handover assistance information is further indicative of a fourth pool of random access channel resources to be used by said terminal upon fallback to contention-based random access during said handover processing when a new protocol data unit session corresponding to a new network slice different from said at least one network slice is established and a protocol data unit session corresponding to a network slice of said at least one network slice is released. Further, according to such variation, an exemplary method according to exemplary embodiments of the present invention may comprise an operation of monitoring for establishment of a second network slice different from said at least one network slice, an operation of monitoring for release of a third network slice of said at least one network slice, and an operation of utilizing, if establishment of said second network slice and release of said third network slice is detected as a result of said monitoring, said fourth pool of random access channel resources upon fallback to contention-based random access during said handover processing.

According to further exemplary embodiments of the present invention, said handover command message is received from said source access point.

The handover processing may be a conditional handover processing.

According to further exemplary embodiments of the present invention, said first pool of random access channel resources is a pre-defined first pool of random access channel resources.

According to further exemplary embodiments of the present invention, said information indicative of said pre-defined first pool of random access channel resources are provided in system information.

Figure 13:
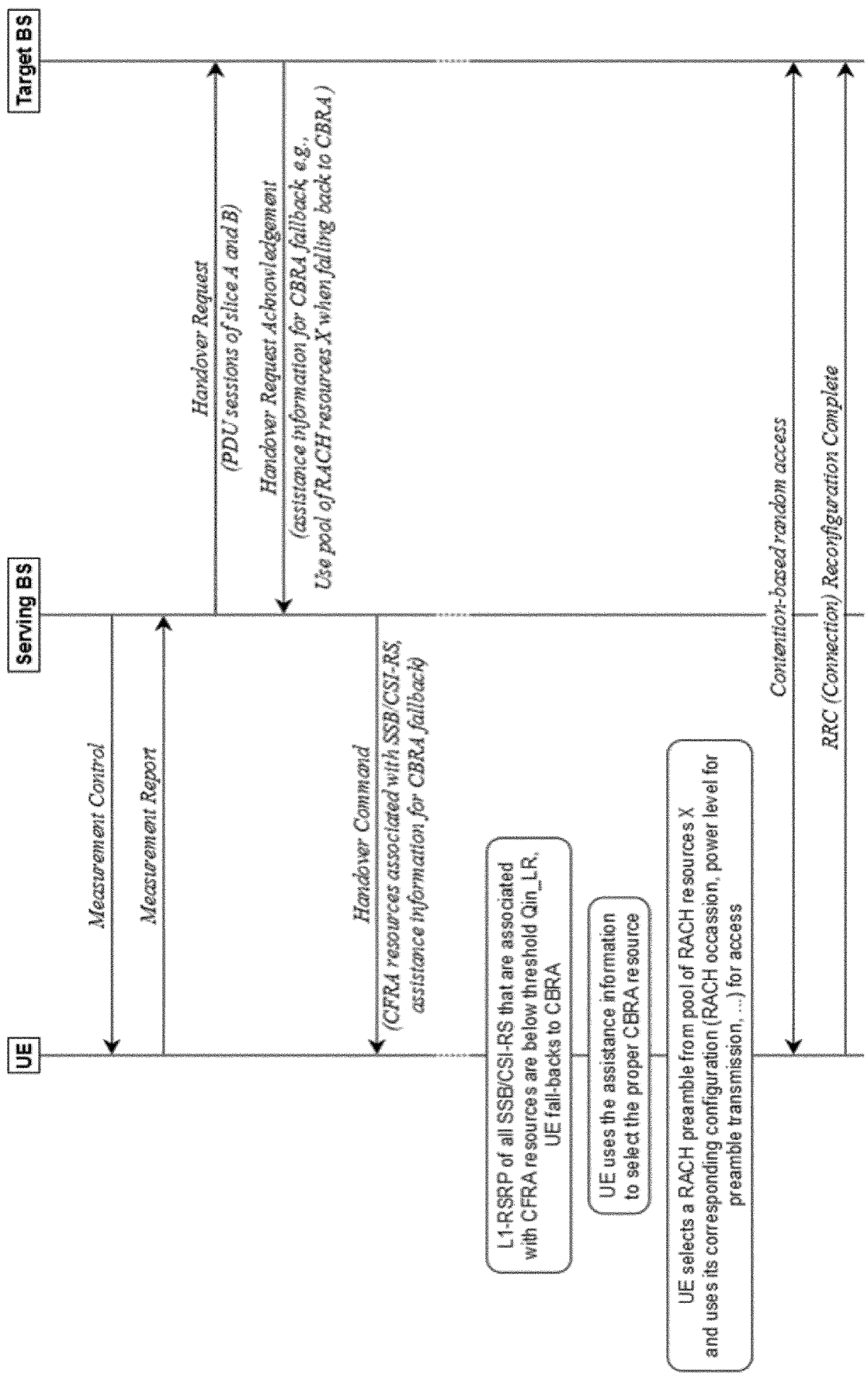
FIG. 13 shows a schematic diagram of an example of a system environment with signaling variants according to exemplary embodiments of the present invention.
Figure 14:
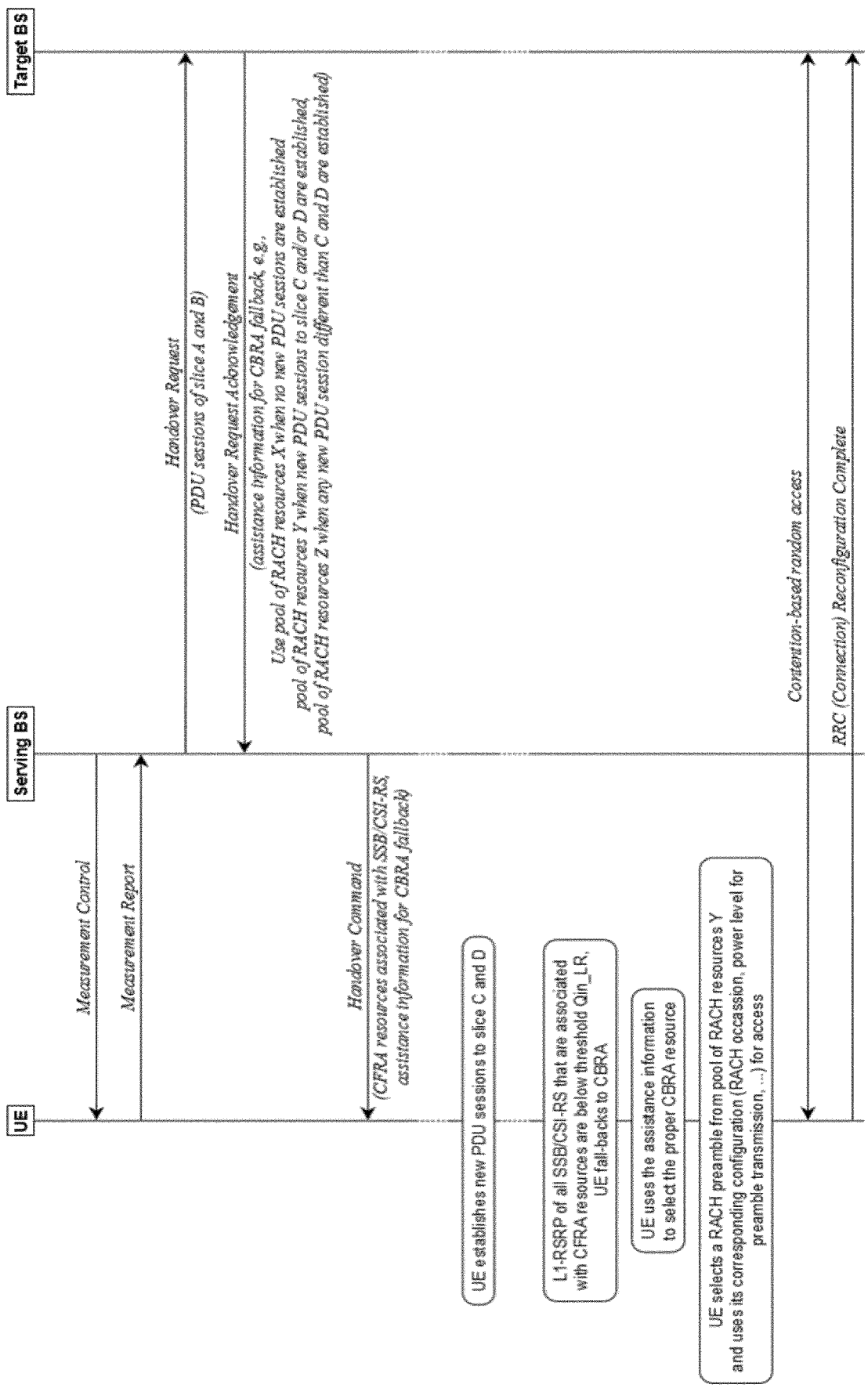
FIG. 14 shows a schematic diagram of an example of a system environment with signaling variants according to exemplary embodiments of the present invention.
Figure 15:
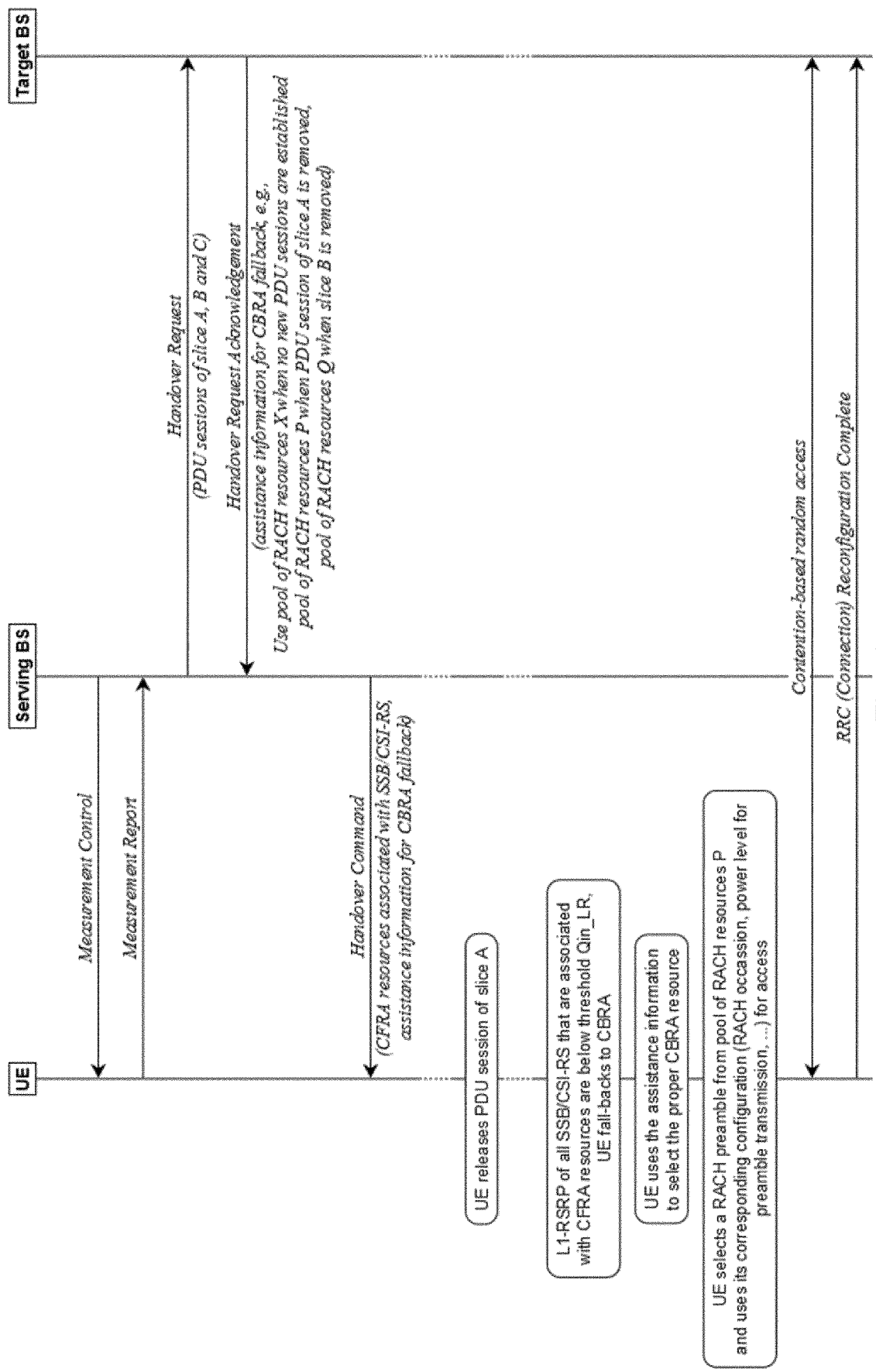
FIG. 15 shows a schematic diagram of an example of a system environment with signaling variants according to exemplary embodiments of the present invention.

FIGS. 13 to 15 illustrate exemplary embodiments of the present invention in more detail.

FIG. 13 shows a schematic diagram of an example of a system environment with signaling variants according to exemplary embodiments of the present invention. In particular, FIG. 13 illustrates a case when UE PDU sessions to be handed over are not changed when the handover is executed.

According to exemplary embodiments of the present invention, the pool of RACH resources X corresponds to a network slice, e.g., A or B.

According to further exemplary embodiments of the present invention, the pools of RACH resources are pre-defined and provided in the system information or handover command.

According to further exemplary embodiments of the present invention, the assistance information provided by the target cell indicates the indices of the pools of RACH resources to consider when falling back to CBRA, e.g., Pool 1, 2 and so on. Each pool of RACH resource is associated with a set of RACH preambles to be used. For CBRA, the UE picks up randomly one RACH preamble from those that are associated with the selected pool of RACH resource.

According to further exemplary embodiments of the present invention, the UE selects the RACH preamble from the configured pool of RACH resources X when falling back to CBRA and sends the RACH preamble on the RACH occasion and using the transmit power that is associated with the pool of RACH resources X.

FIG. 14 shows a schematic diagram of an example of a system environment with signaling variants according to exemplary embodiments of the present invention. In particular, FIG. 14 illustrates a case when the UE establishes new PDU sessions before the handover is executed.

In detail, according to exemplary embodiments of the present invention, the target cell may provide proactively assistance information to be used when new PDU sessions corresponding to new slices are established.

In the example shown in FIG. 14, the pool of RACH resources X may correspond to A or B and the pool of RACH resources Y may correspond to network slice C or D, for instance.

FIG. 15 shows a schematic diagram of an example of a system environment with signaling variants according to exemplary embodiments of the present invention. In particular, FIG. 15 illustrates a case when the UE releases some of the existing PDU sessions before the handover is executed.

In detail, according to exemplary embodiments of the present invention, the target cell may provide proactively assistance information to be used when some of the existing PDU sessions are released.

In the example shown in FIG. 15, the pool of RACH resources X may correspond to A or B, the pool of RACH resources Y may correspond to network slice C or B, and the pool of RACH resources Q may correspond to network slice A or C.

According to still further exemplary embodiments of the present invention, the target cell may provide assistance information in case new PDU sessions corresponding to new network slices are added and some of the existing PDU session are released. These still further exemplary embodiments may be implemented as a combination of the concept of embodiments explained in relation to FIG. 14 and the concept of embodiments explained in relation to FIG. 15.

Exemplary embodiments of the present invention in particular bear the advantage that the target cell can make the proper decision (on behalf of the UE) which pool of RACH resource to use when falling back to CBRA in light of the instantaneous information about the number of camped and connected UEs for each network slice, available RACH resources, etc.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the mentioned function. Also, such function is to be construed to be equivalently implementable by specifically configured circuitry or means for performing the respective function (i.e. the expression "unit configured to" is construed to be equivalent to an expression such as "means for").

Figure 16:
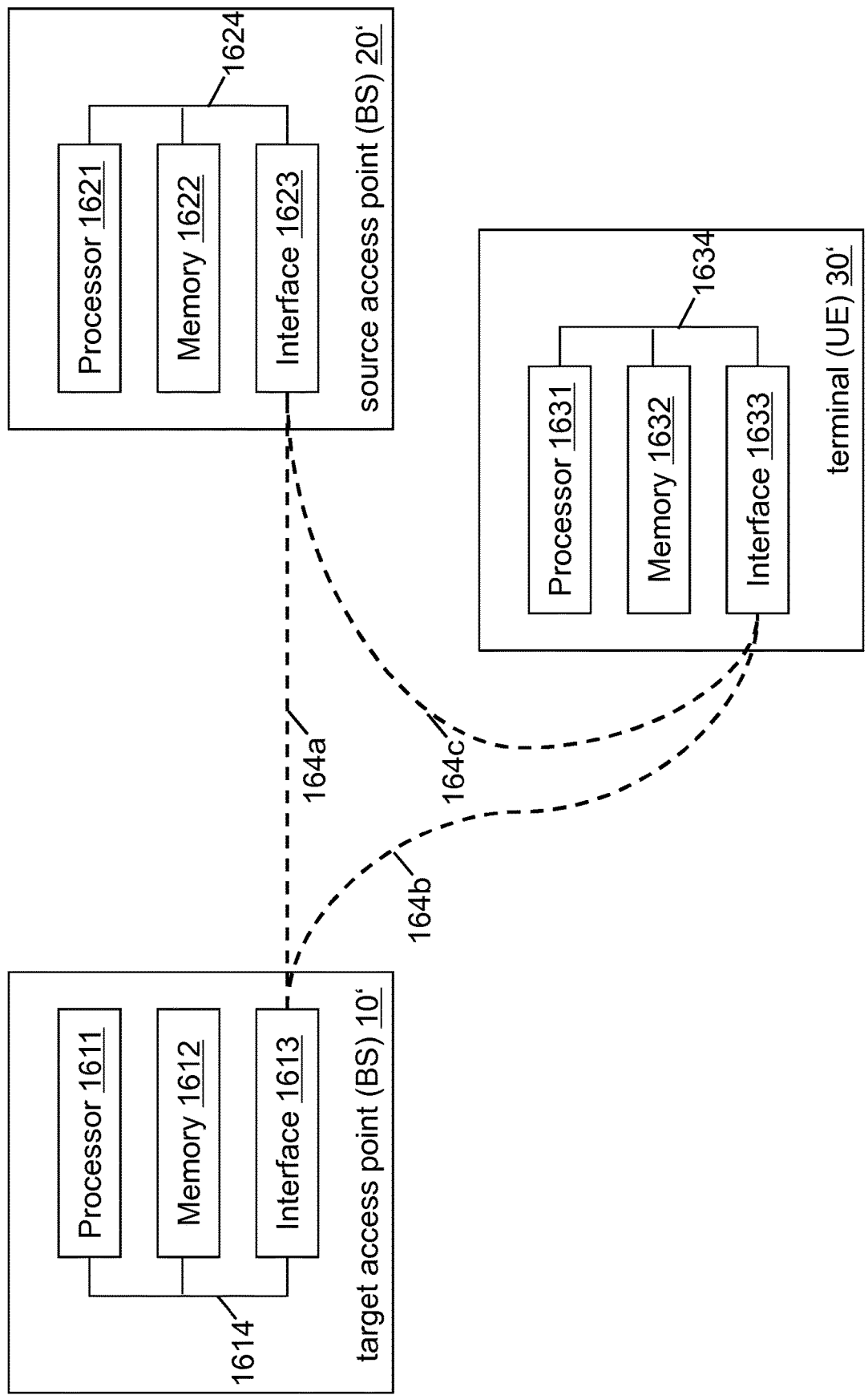
FIG. 16 is a block diagram alternatively illustrating apparatuses according to exemplary embodiments of the present invention.

In FIG. 16, an alternative illustration of apparatuses according to exemplary embodiments of the present invention is depicted. As indicated in FIG. 16, according to exemplary embodiments of the present invention, the apparatus (target access point) 10' (corresponding to the target access point 10) comprises a processor 1611, a memory 1612 and an interface 1613, which are connected by a bus 1614 or the like. Further, according to exemplary embodiments of the present invention, the apparatus (source access point) 20' (corresponding to the source access point 20) comprises a processor 1621, a memory 1622 and an interface 1623, which are connected by a bus 1624 or the like. Further, according to exemplary embodiments of the present invention, the apparatus (terminal) 30' (corresponding to the terminal 30) comprises a processor 1631, a memory 1632 and an interface 1633, which are connected by a bus 1634 or the like. The apparatuses may be connected via links 164a, 164b, 164c, respectively.

The processor 1611/1621/1631 and/or the interface 1613/1623/1633 may also include a modem or the like to facilitate communication over a (hardwire or wireless) link, respectively. The interface 1613/1623/1633 may include a suitable transceiver coupled to one or more antennas or communication means for (hardwire or wireless) communications with the linked or connected device(s), respectively. The interface 1613/1623/1633 is generally configured to communicate with at least one other apparatus, i.e. the interface thereof.

The memory 1612/1622/1632 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the target access point 10 (being a target of a handover of a terminal connected to at least one network slice from a source access point) comprises at least one processor 1611, at least one memory 1612 including computer program code, and at least one interface 1613 configured for communication with at least another apparatus. The processor (i.e. the at least one processor 1611, with the at least one memory 1612 and the computer program code) is configured to perform receiving a handover request including information on said at least one network slice (thus the apparatus comprising corresponding means for receiving), to perform selecting, from a plurality of pools of random access channel resources to be used for contention-based random access processing, a first pool of random access channel resources to be used by said terminal upon fallback to contention-based random access during a handover processing, wherein said selecting is based on at least one of network slice related information on terminals in RRC idle mode, on terminals in RRC inactive mode, and/or on terminals in RRC connected mode, and of available random access channel resources (thus the apparatus comprising corresponding means for selecting), and to perform transmitting a handover request acknowledgement message including handover assistance information indicative of said first pool of random access channel resources (thus the apparatus comprising corresponding means for transmitting).

According to exemplary embodiments of the present invention, an apparatus representing the source access point 20 (being a source of a handover of a terminal connected to at least one network slice from said source access point to a target access point) comprises at least one processor 1621, at least one memory 1622 including computer program code, and at least one interface 1623 configured for communication with at least another apparatus. The processor (i.e. the at least one processor 1621, with the at least one memory 1622 and the computer program code) is configured to perform transmitting a handover request including information on said at least one network slice (thus the apparatus comprising corresponding means for transmitting), to perform receiving a handover request acknowledgement message including handover assistance information indicative of a first pool of random access channel resources of a plurality of pools of random access channel resources to be used for contention-based random access processing, said first pool of random access channel resources being to be used by said terminal upon fallback to contention-based random access during a handover processing (thus the apparatus comprising corresponding means for receiving), and to perform transmitting a handover command message including a specification of random access channel resources to be used by said terminal for contention-free random access during a handover processing and said handover assistance information indicative of said first pool of random access channel resources (thus the apparatus comprising corresponding means for transmitting).

According to exemplary embodiments of the present invention, an apparatus representing the terminal 30 (being connected to at least one network slice and being subject to a handover from a source access point to a target access point) comprises at least one processor 1631, at least one memory 1632 including computer program code, and at least one interface 1633 configured for communication with at least another apparatus. The processor (i.e. the at least one processor 1631, with the at least one memory 1632 and the computer program code) is configured to perform receiving a handover command message including a specification of random access channel resources to be used by said terminal for contention-free random access during a handover processing and handover assistance information indicative of a first pool of random access channel resources of a plurality of pools of random access channel resources to be used for contention-based random access processing, said first pool of random access channel resources being to be used by said terminal upon fallback to contention-based random access during said handover processing (thus the apparatus comprising corresponding means for receiving), and to perform utilizing said first pool of random access channel resources upon fallback to contention-based random access during said handover processing (thus the apparatus comprising corresponding means for utilizing).

For further details regarding the operability/functionality of the individual apparatuses, reference is made to the above description in connection with any one of FIGS. 1 to 16, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for network-assisted fallback to contention-based random access. Such measures exemplarily comprise, at a target access point being a target of a handover of a terminal connected to at least one network slice from a source access point, receiving a handover request including information on said at least one network slice, selecting, from a plurality of pools of random access channel resources to be used for contention-based random access processing, a first pool of random access channel resources to be used by said terminal upon fallback to contention-based random access during a handover processing, wherein said selecting is based on at least one of network slice related information on terminals in RRC idle mode, on terminals in RRC inactive mode, and/or on terminals in RRC connected mode, and of available random access channel resources, and transmitting a handover request acknowledgement message including handover assistance information indicative of said first pool of random access channel resources.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of Acronyms and Abbreviations

3GPP 3rd Generation Partnership Project
CBRA Contention-Based Random Access
CFRA Contention-Free Random Access
CHO conditional handover
CSI-RS channel state information reference signal
C-RNTI Cell-Radio Network Temporary Identifier
DL downlink
eMBB enhanced Mobile Broadband
HO Handover
MAC Medium Access Control
NR New Radio
PDU protocol data unit
PUCCH Physical Uplink Control Channel
RACH Random-Access Channel
RAR Random-Access Response
RRC radio resource control
RSRP Reference Signal Received Strength
SCell Secondary Cell
SD Slice Differentiator
SI System Information
SR Scheduling Request
SSB synchronization signal block
SST Slice Service Type
S-NSSAI Single-Network Slice Selection Assistance Information
TS Technical Specification
UE user equipment
UL uplink
URLLC Ultra-Reliable Low Latency Communication

What is claimed is:

1. A user equipment connected to at least one network slice and being subject to a handover from a source access point to a target access point, the user equipment comprising:
at least one processor;
at least one interface configured for communication with at least another apparatus;
a memory comprising computer-executable instructions that, when executed by the at least one processor, cause the user equipment to perform the following:
receiving a handover command message including a specification of random access channel resources to be used by said user equipment for contention-free random access during a handover processing;
receiving handover assistance information indicative of a first pool of random access channel resources of a plurality of pools of random access channel resources to be used for contention-based random access processing, said first pool of random access channel resources being to be used by said user equipment upon fallback to contention-based random access during said handover processing, wherein each of said plurality of pools of random access channel resources corresponds to a respective of a plurality of network slices, said handover assistance information comprises a specification of a first network slice of said at least one network slice and a specification of transmit power, wherein said first network slice is associated with said first pool of random access channel resources, wherein the transmit power is to be used by said user equipment upon fallback to contention-based random access during said handover processing when using said first pool of random access channel resources; and
utilizing said first pool of random access channel resources upon fallback to contention-based random access during said handover processing,
wherein said first pool of random access channel resources is selected from said plurality of pools of random access channel resources based on network slice related information on terminals in radio resource control idle mode, on terminals in radio resource control inactive mode, on terminals in radio resource control connected mode, and of available random access channel resources,
wherein each of said plurality of pools of random access channel resources has a respective index, said handover assistance information comprises a specification of an index of said first pool of random access channel resources, and the user equipment further comprises deriving circuitry configured to derive said first pool of random access channel resources from said specification of said index,
wherein said handover assistance information is further indicative of a second pool of random access channel resources to be used by said user equipment upon fallback to contention-based random access during said handover processing when a new protocol data unit session corresponding to a new network slice different from said at least one network slice is established and a protocol data unit session corresponding to a network slice of said at least one network slice is released,
wherein said handover assistance information is further indicative of a third pool of random access channel resources to be used by a terminal upon fallback to contention-based random access during said handover processing when a protocol data unit session corresponding to a network slice of said at least one network slice is released, and wherein said handover assistance information is further indicative of a fourth pool of random access channel resources to be used by said terminal upon fallback to contention-based random access during said handover processing when a new protocol data unit session corresponding to a new network slice different from said at least one network slice is established and a protocol data unit session corresponding to a network slice of said at least one network slice is released; and monitoring circuitry configured to:
  monitor for establishment of a second network slice different from said first network slice, the monitoring circuitry configured to monitor for release of a third network slice of said at least one network slice; and
  based on the monitoring, detecting the establishment of the second network slice and the release of the third network slice of said at least one network slice;
deriving circuitry configured to derive said first pool of random access channel resources from said specification of said first network slice; and
utilizing circuitry configured to utilize, based on the establishment of said second network slice and the release of said third network slice being detected, said second pool of random access channel resources upon fallback to contention-based random access during said handover processing.

2. The user equipment according to claim 1, wherein each of said plurality of pools of random access channel resources is associated with a respective set of random access channel preambles, and the user equipment further comprises determining circuitry configured to determine a first set of random access channel preambles associated with said first pool of random access channel resources, and selecting circuitry configured to select a random access channel preamble of said first set of random access channel preambles.

3. The user equipment according to claim 2, further comprising picking-up circuitry configured to pick up randomly said random access channel preamble.

4. The user equipment according to claim 2, further comprising sending circuitry configured to send said random access channel preamble in a random access channel occasion.

5. The user equipment according to claim 4, said sending circuitry is configured to send said random access channel preamble in said random access channel occasion with said transmit power.

6. The user equipment according to claim 4, wherein said handover command message is received from said source access point.

7. The user equipment according to claim 6, wherein said handover processing is a conditional handover processing.

8. The user equipment according to claim 7, wherein said first pool of random access channel resources is a pre-defined first pool of random access channel resources, and optionally information indicative of said pre-defined first pool of random access channel resources are provided in system information.

9. A system comprising:
  user equipment connected to at least one network slice and being subject to a handover from a source access point to a target access point, the user equipment comprising:
    a processor;
    a memory comprising computer-executable instructions that, when executed by the processor, cause the processor to perform the following operations:
      receiving a handover command message including a specification of random access channel resources to be used by the user equipment for contention-free random access during a handover processing;
      receiving handover assistance information indicative of a first pool of random access channel resources of a plurality of pools of random access channel resources to be used for contention-based random access processing, the first pool of random access channel resources being to be used by the user equipment upon fallback to contention-based random access during the handover processing, wherein each of the plurality of pools of random access channel resources corresponds to a respective of a plurality of network slices, wherein the handover assistance information comprises a specification of a first network slice of the at least one network slice and a specification of transmit power, wherein the first network slice is associated with the first pool of random access channel resources, and wherein the transmit power is to be used by the user equipment upon fallback to contention-based random access during the handover processing when using the first pool of random access channel resources; and
      utilizing the first pool of random access channel resources upon fallback to contention-based random access during the handover processing, wherein the first pool of random access channel resources is selected from the plurality of pools of random access channel resources based on network slice related information on terminals in radio resource control idle mode, on terminals in radio resource control inactive mode, on terminals in radio resource control connected mode, and on available random access channel resources, wherein each of the plurality of pools of random access channel resources has a respective index, said handover assistance information comprises a specification of an index of said first pool of random access channel resources, and the user equipment further comprises deriving circuitry configured to derive said first pool of random access channel resources from said specification of said index, wherein the handover assistance information is further indicative of a second pool of random access channel resources to be used by the user equipment upon fallback to contention-based random access during the handover processing when a new protocol data unit session corresponding to a new network slice different from the at least one network slice is established and a protocol data unit session corresponding to a network slice of the at least one network slice is released, wherein said handover assistance information is further indicative of a third pool of random access channel resources to be used by a terminal upon fallback to contention-based random access during said handover processing when a protocol data unit session corresponding to a network slice of said at least one network slice is released, and wherein said handover assistance information is further indicative of a fourth pool of random access channel resources to be used by said terminal upon fallback to contention-based random access during said handover processing when a new protocol data unit session corresponding to a new network slice different from said at least one network slice is established and a protocol data unit session corresponding to a network slice of said at least one network slice is released;
monitoring for establishment of a second network slice different from the first network slice;
monitoring for release of a third network slice of the at least one network slice; based on the monitoring, detecting the establishment of the second network slice and the release of the third network slice of the at least one network slice;
driving said first pool of random access channel resources from said specification of said first network slice; and
utilizing, based on the establishment of the second network slice and the release of the third network slice being detected, the second pool of random access channel resources upon fallback to contention-based random access during the handover processing.

10. The system of claim 9, wherein each of the plurality of pools of random access channel resources is associated with a respective set of random access channel preambles, and wherein the computer-executable instructions further cause the processor to:
determine a first set of random access channel preambles associated with the first pool of random access channel resources; and
select a random access channel preamble of said first set of random access channel preambles.

11. The system of claim 9, wherein the computer-executable instructions further cause the processor to send the random access channel preamble in a random access channel occasion.

12. The system of claim 11, wherein the computer-executable instructions further cause the processor to send the random access channel preamble in the random access channel occasion with the transmit power.

13. The system of claim 9, wherein the handover command message is received from the source access point.

14. A method comprising:
receiving, by a user equipment connected to at least one network slice and being subject to a handover from a source access point to a target access point, a handover command message including a specification of random access channel resources to be used user equipment for contention-free random access during a handover processing;
receiving, by the user equipment, handover assistance information indicative of a first pool of random access channel resources of a plurality of pools of random access channel resources to be used for contention-based random access processing, the first pool of random access channel resources being to be used by the user equipment upon fallback to contention-based random access during the handover processing, wherein each of the plurality of pools of random access channel resources corresponds to a respective of a plurality of network slices, wherein the handover assistance information comprises a specification of a first network slice of the at least one network slice and a specification of transmit power, wherein the first network slice is associated with the first pool of random access channel resources, and wherein the transmit power is to be used by the user equipment upon fallback to contention-based random access during the handover processing when using the first pool of random access channel resources; and
utilizing, by the user equipment, the first pool of random access channel resources upon fallback to contention-based random access during the handover processing, wherein the first pool of random access channel resources is selected from the plurality of pools of random access channel resources based on network slice related information on terminals in radio resource control idle mode, on terminals in radio resource control inactive mode, on terminals in radio resource control connected mode, and on available random access channel resources, wherein each of said plurality of pools of random access channel resources has a respective index, said handover assistance information comprises a specification of an index of said first pool of random access channel resources, and the user equipment further comprises deriving circuitry configured to derive said first pool of random access channel resources from said specification of said index, wherein the handover assistance information is further indicative of a second pool of random access channel resources to be used by the user equipment upon fallback to contention-based random access during the handover processing when a new protocol data unit session corresponding to a new network slice different from the at least one network slice is established and a protocol data unit session corresponding to a network slice of the at least one network slice is released, wherein said handover assistance information is further indicative of a third pool of random access channel resources to be used by a terminal upon fallback to contention-based random access during said handover processing when a protocol data unit session corresponding to a network slice of said at least one network slice is released, and wherein said handover assistance information is further indicative of a fourth pool of random access channel resources to be used by said terminal upon fallback to contention-based random access during said handover processing when a new protocol data unit session corresponding to a new network slice different from said at least one network slice is established and a protocol data unit session corresponding to a network slice of said at least one network slice is released;
monitoring, by the user equipment, for establishment of a second network slice different from the first network slice;
monitoring, by the user equipment, for release of a third network slice of the at least one network slice;
based on the monitoring, detecting, by the user equipment, the establishment of the second network slice and the release of the third network slice of the at least one network slice;
driving said first pool of random access channel resources from said specification of said first network slice; and
utilizing, by the user equipment, based on the establishment of the second network slice and the release of the third network slice being detected, the second pool of random access channel resources upon fallback to contention-based random access during the handover processing.

* * * * *